July 18, 1933.  W. A. MARRISON  1,918,976
PIEZO ELECTRIC CRYSTALS
Filed June 6, 1930

INVENTOR
W. A. MARRISON
BY
ATTORNEY

Patented July 18, 1933

1,918,976

UNITED STATES PATENT OFFICE

WARREN A. MARRISON, OF MAPLEWOOD, NEW JERSEY, ASSIGNOR TO BELL TELEPHONE LABORATORIES, INCORPORATED, OF NEW YORK, N. Y., A CORPORATION OF NEW YORK

PIEZO-ELECTRIC CRYSTALS

Application filed June 6, 1930. Serial No. 459,579.

This invention relates to piezo-electric crystals and more particularly to a method for determining the directions of the electric and crystallographic axes of said crystals, and for determining if a crystal is free from twinning.

An object of the invention is to provide a method of determining the directions of the electric and crystallographic axes of an irregular crystal or crystal fragment not having well defined crystal faces, which shall be simple and accurate.

Another object of the invention is to provide a method of determining if a crystal is free from twinning.

In accordance with the present invention a piezo-electric crystal, for example, quartz, which may be of the so-called "river washed" variety, or may be an irregular fragment of a large crystal, is examined to determine the direction of its optic axis by well-known optical means, such as a polariscope. A smooth unpolished surface is then prepared perpendicular to the optic axis and this surface is etched with hydrofluoric acid. The process of etching forms a large number of microscopic plane facets over the surface of the crystal on the sides of minute triangular cones, some of which are protruding and some directed into the surface. Light from a fixed point source is then directed toward the prepared surface, and while the surface is viewed from another fixed point the crystal is rotated about its optic axis and the angular position of the crystal at which the intensity of the reflected light is at a maximum is noted. These maxima are then compared with a similar indication obtained from a crystal similarly prepared and manipulated, but in which the directions of the electric and crystallographic axes are known.

An alternative method is to cut a cylindrical element from a crystal having the axis of the cylinder parallel to the optic axis, etch the curved surface, rotate the cylinder about its optic axis, and observe the relative intensity of light reflected from its surface, (in this case the curved surface) as before.

The first method discussed above may also be used to determine whether a crystal under examination is free from twinning. If twinning is present in the surface under examination, at certain angles the surface will appear to consist of dark and light patches with straight or jagged boundaries. This indication is quite definite and unmistakable to one who has observed a few crystals in this manner.

Figure 1:
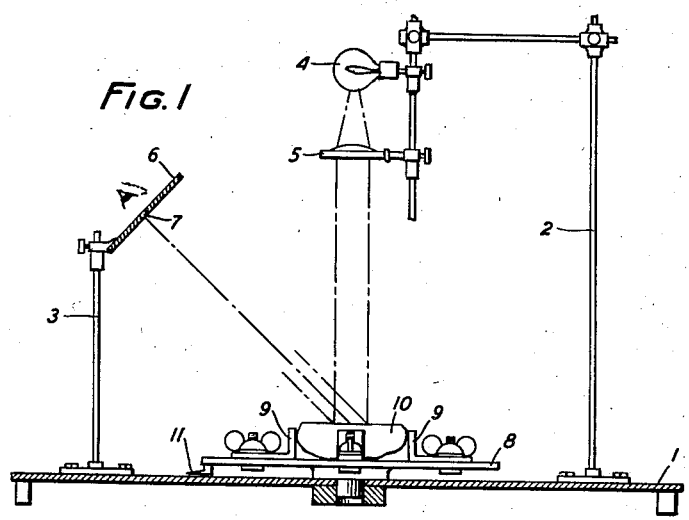
Fig. 1 is a diagram of apparatus set up in accordance with the principles of this invention.
Figure 2:
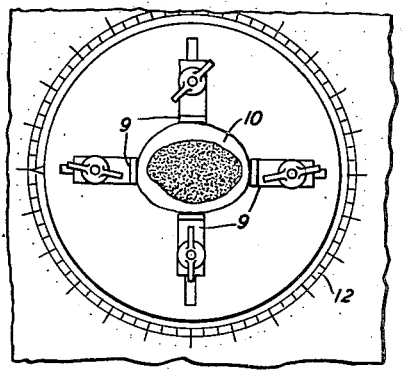
Fig. 2 is a plan view of the rotatable support of Fig. 1.
Figure 3:
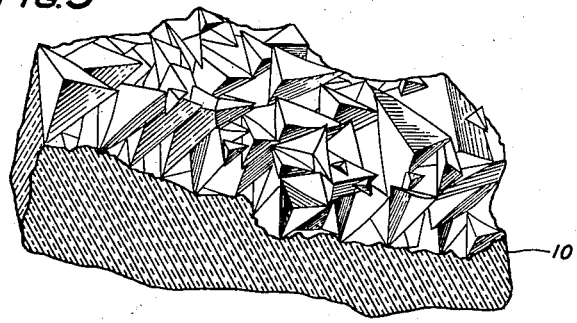
Fig. 3 is a sketch, made from a microphotograph, of the surface of a cross-section of a crystal cut perpendicular to the optic axis after being etched with hydrofluoric acid, and shows the minute triangular cones referred to above.

In Fig. 1 a rigid table 1 has fixedly attached thereto a supporting member 2 and a second supporting member 3. Mounted on the support 2 is an electric light 4, or other source of light, and a lens 5 for directing the light rays toward the etched surface. Mounted on the support 3 is a member 6 in which an aperture 7 is provided for viewing the quartz crystal. Rotatably mounted upon the table 1 is a turntable 8 which is provided with adjustable braces 9 for mounting a quartz crystal 10 in the line of the light beam from the light source. This turntable is provided with a pointer 11 for indicating the angular position of the turntable, and hence of the quartz crystal, with respect to the rigid table 1, which is provided with a scale 12 (Fig. 2) to permit an accurate reading to be made.

A quartz crystal section cut perpendicular to its optic axis, the surface of which has been etched, and the directions of whose electric and crystallographic axes are known, is mounted in position on the turntable so as to be rotatable about its optic axis. The direction of the electric and crystallographic axes with respect to the table 1 is noted. The turntable is then slowly revolved until a point is reached at which the intensity of the light reflected from the surface of the crystal when viewed through the aperture 7 is at a maximum. This position is then noted. The turntable is then revolved farther until a second maximum point is found, and similarly until a third maximum point is found. These points will lie approximately 120° apart. Approximately midway between each of two points of maximum intensity, and uniformly spaced, there will be found three other points at which the intensity of the reflected light is greater than that reflected from the surface normally, but less than at the points 120° apart above referred to. These points may also be noted for reference, if desired. The crystal whose axes are known is then replaced with a second crystal prepared and mounted similarly to the first, but the directions of whose electric and crystallographic axes are not shown. The turntable is again revolved, and the angular positions at which the intensity of the reflected light is at a maximum are noted. These points of maximum intensity bear a fixed relationship to the electric and crystallographic axes, and by comparison of the points of maximum intensity of the two crystals with each other, and with the direction of the electric and crystallographic axes of the crystal whose axes are known, the directions of the electric and crystallographic axes of the second crystal may be determined to a high degree of accuracy.

The same process is employed when an element having at least a partially cylindrical surface is cut from a crystal with the axis of the curved surface parallel to the optic axis. A crystal, the directions of whose axes are known is first examined to provide a standard, and then replaced by a crystal similarly prepared, and the direction of its axis determined by a similar observation. Of course, in the case of cylindrical surface, the light would have to be moved from the position indicated in Fig. 1, so that its beam may be directed toward the curved surface.

In the former method, described above, twinning shows up in a striking manner. If the same crystal contains both right hand and left hand structure it is said to be twinned. In that case it has been found that the large maxima of one portion coincide approximately with the smaller maxima of the other. It results that in such a composite crystal structure the large maxima for right and left hand structure occur at angles about 60° apart. Therefore, if a surface is examined on which twinning occurs, there will be points during the revolution of the table at which the surface will appear to consist of dark and light patches with straight or jagged boundaries. Such crystals do not ordinarily exhibit suitable piezo-electric properties for use in connection with electrical circuits, and may therefore be eliminated at this stage without further work being done on them, although if the patches are of sufficient size, the twinned crystal may be cut into pieces of all right-hand and all left-hand material which may be used.

What is claimed is:

1. The method of determining the directions of the electric and crystallographic axes of a crystal, which comprises etching a surface of a crystal whose axes are all known perpendicular to its optic axis, noting the relative intensity of light reflected from said surface as said crystal is rotated about its optic axis, etching a surface of the crystal whose axes are to be determined that is perpendicular to its optic axis and noting from the same relative position the intensity of the light reflected from the surface of the unknown crystal as it is rotated and comparing the positions of maximum light reflection from the two crystals.

2. The method of determining the directions of the electric and crystallographic axes of a crystal which comprises cutting a cylinder from said crystal with the curved surface parallel to the optic axis, etching said curved surface, noting the relative intensity of light reflected from said curved surface as said cylinder is rotated about its optic axis and comparing the positions of maximum reflection with those obtained from a similarly etched and rotated crystal whose axes are known.

3. The method of determining the directions of the electric and crystallographic axes of a piezo-electric crystal which comprises etching a surface of a piezo-electric crystal, the directions of whose axes are known, which is perpendicular to its optic axis, etching a like surface of a second piezo-electric crystal the directions of whose axes are to be determined, and comparing the relative intensity of light from a given source reflected to the same point from the surfaces of said crystals as they are rotated about their optic axes.

WARREN A. MARRISON.